United States Patent [19]

Inada et al.

[11] 3,971,406
[45] July 27, 1976

[54] VAPOR FUEL CONTROL APPARATUS

[75] Inventors: Masami Inada, Toyoake; Shuji Okumura, Obu, both of Japan

[73] Assignee: Aisin Seiki Kabushiki Kaisha, Japan

[22] Filed: Oct. 24, 1974

[21] Appl. No.: 517,611

[30] Foreign Application Priority Data

Oct. 24, 1973  Japan.............................. 48-119759

[52] U.S. Cl. ............................................ 137/493.4
[51] Int. Cl.² ........................................ F16K 17/26
[58] Field of Search............. 137/493.4, 493.6, 493, 137/493.1, 493.2, 493.3, 493.5; 220/203; 251/144

[56] References Cited
UNITED STATES PATENTS

| | | | |
|---|---|---|---|
| 2,191,636 | 2/1940 | Walker .......................... | 137/493.4 |
| 3,061,138 | 10/1962 | Edelmann et al............ | 137/493.6 X |
| 3,108,610 | 10/1963 | DeSee.......................... | 137/493.4 X |
| 3,831,801 | 8/1974 | Rodgers....................... | 137/493 |

FOREIGN PATENTS OR APPLICATIONS

| | | | |
|---|---|---|---|
| 1,810,550 | 6/1970 | Germany ....................... | 137/493.4 |

Primary Examiner—Martin P. Schwadron
Assistant Examiner—Robert J. Miller
Attorney, Agent, or Firm—Oblon, Fisher, Spivak, McClelland & Maier

[57] ABSTRACT

A vapor fuel control apparatus adapted to be connected between a gasoline tank and a filter-supporting canister of a fuel supply system to an engine, comprising a main body, first valve means movably disposed within the main body and forming a first valve member therewith, second valve means movably disposed within the first valve means and forming a second valve member therewith, first spring means interposed between the main body and the first valve means urging said first valve means to move in one direction, and second spring means interposed between the first valve means and the second valve means urging said second valve means to move in the opposite direction, and both of first and second spring means holding the closing states of the first and second valve means at respective preset values.

2 Claims, 2 Drawing Figures

VAPOR FUEL CONTROL APPARATUS

BACKGROUND OF THE INVENTION

1. Field of the Invention

This invention relates generally to a fuel vapor control apparatus for use in a gasoline powered engine, such as an automobile engine, and more particularly to a fuel vapor control apparatus having valve means therein which can be kept closed by a biasing means to respective preset values even if the pressure of a gasoline vapor on the one side becomes larger than that of a canister vapor on the other side, and vice versa.

2. Description of the Prior Art

In general, a fuel vapor control apparatus is disposed between a gas-liquid separator attached to a gasoline tank and a canister connected to a carburetor via a pipe or suitable conduit.

In the conventional fuel vapor control apparatus, a valve member thereof usually constructed of a flexible material, such as, for example, rubber, and a thin notched groove is formed on the central portion of the valve member. A spring is usually provided for holding the valve member in a preselected position, and when the pressure of gasoline vapor at the gasoline tank side becomes higher than the preset load of the spring, as upon fully filling the gasoline tank, a projecting portion of the valve member is released from a seat portion and the pressure of the gasoline vapor is released into a canister. On the other hand, when the pressure of the gasoline vapor on the gasoline tank side approaches a vacuum condition, according to the consumption of the fuel therein, atmospheric pressure flows from the canister side to the gasoline tank side through the notched groove of the valve member. The pressure of the gasoline vapor is extremely increased when the gasoline tank is filled with gasoline, and it becomes hot in the summer time, when exposed to the heat, and since the valve member is made of a flexible rubber, the shape of the valve member is easily deformed after long utilization, such that the effectiveness of the sealability of the valve member is somewhat decreased or damaged, and the pressure of the gasoline tank side is therefore not maintained at a certain pressure. Also, the amount of gasoline vapor being released into the atmospheric air through the notched groove of the valve member becomes quite large.

SUMMARY OF THE INVENTION

Accordingly, it is an object of the present invention to provide an improved fuel vapor control apparatus adapted for obviating the aforementioned drawbacks of conventional systems.

Another object of the present invention is to provide a new and simplified fuel vapor control apparatus which is capable of keeping a gasoline tank at a certain pressure.

The foregoing and other objects are achieved according to the present invention through a fuel vapor control apparatus adapted to be connected between a gasoline tank and a filter-supporting canister of a fuel supply system and having a main body with a through opening, a first valve member movably disposed within the opening of the main body and forming a valve therewith, a first spring means between the main body and the first valve member urging the valve member to move in one direction and providing a preset force for maintaining the closing state of the valve member, a second valve member movably disposed within the first valve member and forming a valve therewith, and a second spring means between the second valve member and the first valve member urging the second valve member to move in the opposite direction of which the first valve member is being urged to move and providing a preset force for maintaining a closing state of the second valve member. The force provided by the first spring means is selected to be just below that which would be provided by the vapor fuel pressure of a completely filled gasoline tank under normal atmospheric conditions.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE PREFERRED EMBODIMENT

Figure 1:
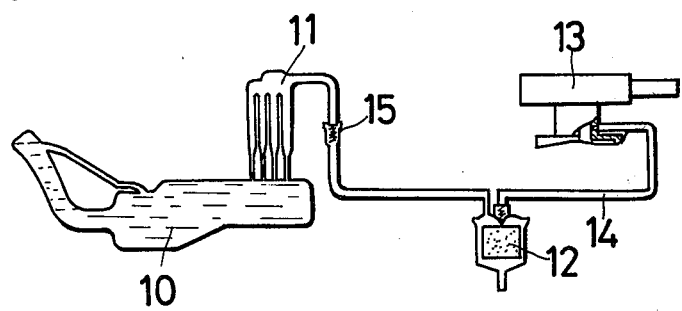
FIG. 1 is a systematic view of a fuel system constructed according to the present invention.

Referring now to the drawings, and more particularly to FIG. 1 thereof, there is shown a gasoline tank 10 having a gas-liquid separator 11 attached to an upper air layer thereof. A filter-supporting canister 12 is connected to a carburetor 13 by a pipe or conduit 14. The gas-fuel separator 11 and the cannister 12 are connected through a fuel vapor control apparatus 15.

Figure 2:
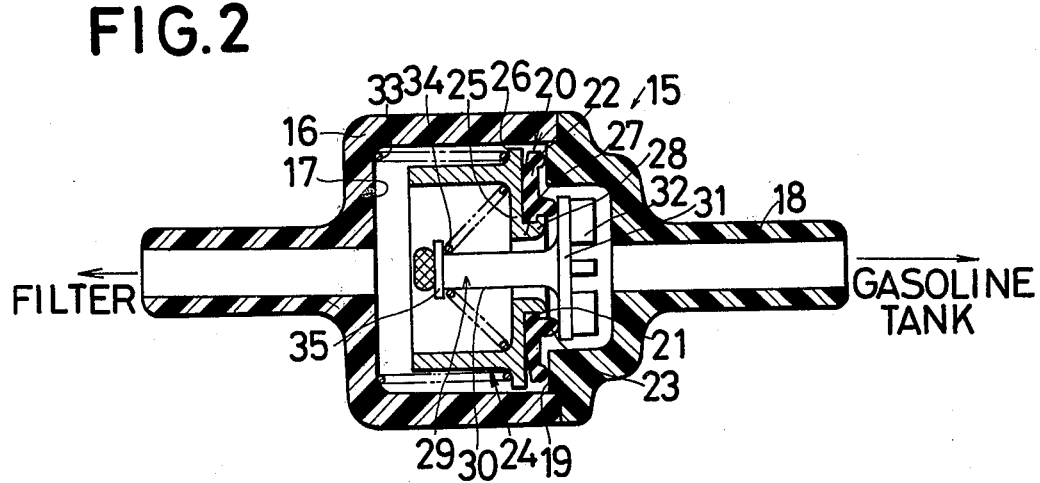
FIG. 2 is a sectional view of a fuel vapor control apparatus utilized in the fuel system shown in FIG. 1.

The fuel vapor control apparatus 15 is shown in detail in FIG. 2 and includes a main body 16 of substantially tubular configuration being made of a synthetic resin material and having an inner end wall surface 17 at one end, providing a seat, as will be described hereinafter. A tube 18 generally of less diameter than the main body, also being made of a synthetic resin material, and being provided with an inner end wall surface 19 on a flanged or outwardly flaring portion at one end thereof, is fixedly connected to the main body 16 by suitable means.

The reference numeral 20 designates an annular valve member having an inner end portion 21 on the inner periphery thereof, a tongue portion 22 on the outer periphery thereof for seating on the inner wall surface 19 of tube 18 and a foot portion 23 adjacent the inner portion thereof. The inner end portion 21, the tongue portion 22 and the foot portion 23 are integrally formed, preferably from an elastomeric or flexible material suitable for providing excellent sealing benefits.

A first stepped cylindrical valve stem generally designated by the reference numeral 24 disposed in the main body 16 includes a radially inwardly extending end wall portion 25, an outer peripheral flange portion 26 at the same end as the end wall portion 25, but extending substantially radially outwardly from the outer wall of the valve stem, an inner substantially axially extending circular wall portion 27 on the inner end of the wall portion 25 to define an axially extending opening therethrough, and a radially outwardly turned valve squeezing portion 28 on the end of the inner wall portion 27 for squeezing the inner end portion 21 of the valve member 20. The wall portion 25, the outer peripheral portion 26, the inner wall portion 27 and the valve squeezing portion 28 are also preferably integrally formed.

A second valve stem generally designated by the reference numeral 29 is provided with a plunger 30 movably disposed within the opening defined by the wall portion 27 of the first valve stem 24 and having a circular disc 31 formed on one end thereof for seating the foot portion 23 of the valve member 20 thereon and a longitudinally projecting portion 32 integrally formed on the disc 31 for maintaining suitable air flow.

A compressed coil spring 33 is disposed between the inner end wall surface 17 of the main body 16 and the outer peripheral flange surface 26 of the first valve stem 24, and the inner end portion 21 of the valve member 20 is squeezed by the valve squeezing portion 28 of the first valve stem 24. One end of a conical spring 34 is contacted with the inner side of the wall portion 25 of the first valve stem 24 and the other end thereof is caulked to the left end portion of the second valve stem 29, as viewed in FIG. 2, through a washer 35, after the plunger 30 of the second valve stem 29 is freely inserted into the opening defined by the axially extending wall portion 27.

Accordingly, when the vapor pressure from the gasoline tank 10 or the canister 12 is not acting on the fuel vapor control apparatus 15, the tongue portion 22 of the valve member 20 and the inner wall surface 19 of the tube 18 are sealingly contacted and the foot portion 23 of the valve member 20 and the disc-shaped seating wall portion 31 of the second valve stem 29 are sealingly contacted.

The operation, according to the present invention, will now be described hereinbelow in further detail, referring for orientation to the invention as viewed in FIG. 2.

The valve member 20 of the fuel vapor control apparatus 15 is urged toward the right by the spring 33, acting through the first valve stem 24, and the tongue portion 22 thereof is sealingly seated on the inner seat surface 19 of the tube 18, and the foot portion 23 of the valve member 20 is sealingly seated on the circular disc 31 of the second valve stem 29 by the leftward biasing force of the spring 34 on the valve stem 29, until the gasoline tank 10 becomes fully filled with gasoline. Therefore, the vapor of the gasoline is not released from the canister 12 into the atmospheric air via the fuel vapor control apparatus 15. The device preferably is constructed such that the biasing force of the spring 33 is almost equal to the force for unseating the tongue portion 22 of the valve member 20 from the inner wall surface 19 of the tube 18 to provide an opening therebetween for vapor fuel flow which is provided by the pressure of fuel vapor occurring upon the full filling of gasoline in the gasoline tank 10.

When the gasoline tank 10 is so fully filled, the tongue portion 22 of the valve member 20 is released from the inner wall surface 19 of the tube 18 by the vapor of the gasoline overcoming the rightward biasing force of the spring 33, and then the vapor of the gasoline freely flows into the filter of canister 12. Accordingly, the vapor of the gasoline is filtered within the canister 12 before being released into the atmosphere.

When the gasoline tank side 10 approaches vacuum, as consumption of the fuel therein occurs, the atmospheric pressure acts on the fuel vapor control apparatus 15 from the filter side 12 and the second valve stem 29 is moved toward the right by the atmospheric pressure against the leftward biasing force of the spring 34, and therefore the circular disc 31 of the second valve stem 29 is released from the foot portion 23 of the valve member 20. Accordingly, atmospheric pressure flows into the gasoline tank 10 from the canister 12 through the opening defined by the inner wall portion 27 of the first valve stem 24 and of course through the gas-fuel separator 11. The pressure of the gasoline tank side 10 is thus held at a certain pressure.

Obviously, many changes and modifications of the present invention are possible in light of the foregoing teachings. It is to be understood therefore, that within the scope of the appended claims, the invention may be practiced otherwise than as specifically described herein.

What is claimed as new and desired to be secured by Letters Patent of the United States is:

1. A fuel vapor control apparatus for use in a fuel system between a gasoline tank and a filter-supporting canister for maintaining the gasoline tank side at a preselected pressure, comprising in combination:

a main body of plastic material having an opening therethrough;

first valve means movably disposed within said opening of said main body and including
  a. a valve stem having a tubular portion, a radially inwardly extending end wall portion integrally formed at one end of said tubular portion, a radially outwardly extending end wall portion integrally formed on the periphery of said tubular portion at said one end thereof, and a valve member squeezing portion integrally formed on the inner end of said radially inwardly extending end wall portion defining a central aperture through said valve stem,
  b. an annular elastic valve member having an inner end portion securely fitted to said end wall portion of said valve stem around said central aperture thereof through said valve member squeezing portion with one end face of said annular valve member being disposed against the outside surface of said end wall portion of said valve stem, an outer tongue portion formed on the peripheral surface of the end wall of said annular valve member facing away from the end wall of said valve stem, and a projecting foot portion also formed on said surface of said annular valve member adjacent to said inner end portion thereof and facing away from the end wall of said valve stem;
  c. a first spring interposed between said main body and said valve stem for urging said annular elastic valve member carried by said valve stem to move in one direction wherein said outer valve tongue is caused to seat on an inner wall of said main body; and second valve means movably disposed within said first valve means and including
  d. a plunger extending through said central aperture of said first valve means,
  e. a circular disc integrally formed on one end of said plunger, having a projecting portion on the face thereof remote from said plunger for maintaining suitable air flow thereby, and
  f. a second spring interposed between the other end of said plunger and said valve stem of said first valve means for urging said circular disc to move in a direction opposite to said one direction of movement of said annular elastic valve member of said first valve means, wherein said circular disc is maintained seated against said projecting foot portion of said annular elastic valve member;

whereby when said gasoline tank is fully filled, said outer tongue portion of said first valve means is released from seating against said inner wall of said main body by the vapor of gasoline, and when said gasoline tank approaches vacuum, said circular disc of said second valve means is released from seating against said projecting foot portion of said first valve means by the atmospheric pressure in said canister.

2. A fuel vapor control apparatus as set forth in claim 1, wherein said second spring is a conical spring with one end thereof being caulked at the end portion of said plunger opposite said one end through a washer.

* * * * *